Patented June 23, 1925.

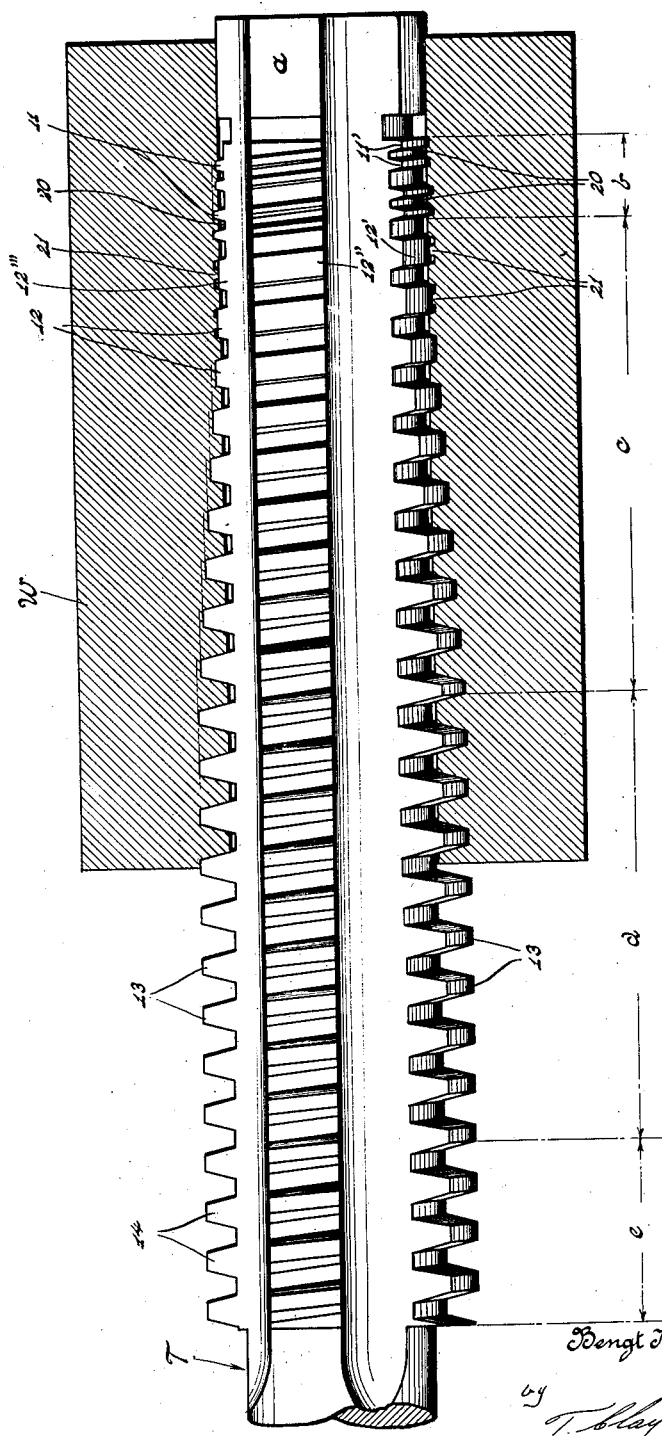

1,543,007

UNITED STATES PATENT OFFICE.

BENGT M. W. HANSON, OF HARTFORD, CONNECTICUT.

TAP.

Application filed November 27, 1922. Serial No. 603,441.

*To all whom it may concern:*

Be it known that I, BENGT M. W. HANSON, a citizen of the United States, and a resident of Hartford, county of Hartford, State of Connecticut, have invented certain new and useful Improvements in Taps, of which the following is a specification.

The aim of the present invention is to provide an improved tap, the purpose being to eliminate some of the objections and disadvantages incident to taps as heretofore constructed.

Generally speaking, the top surfaces of the teeth on the tapered portion of a tap, as heretofore constructed, have been inclined downwardly towards the small or forward end of the tool, and in operation considerable difficulty is experienced and a relatively large amount of power is required to force the tap into the work owing to the fact that the tapered surfaces of the teeth act in the nature of a wedge against the similarly inclined surfaces which they are forming in the work, and a back pressure is set up which tends to hold the tool from going into the work. Also, it has been customary to have the teeth gradually increase in height, commencing with the entering end of the tool; the first tooth taking a shallow, wide cut; the second, a slightly deeper one; the third, a still deeper one, and so on in regular order, the teeth being of substantially the same width at their bases.

In some instances, the cutting edges of the teeth at the forward or small end of the tap have been interrupted or circumferentially grooved so that each tooth has a plurality of relatively narrow cutting serrations or edges with a groove between them, the advantage of this arrangement being that these narrow serrations will cut the work more cleanly and with the expenditure of less energy than would be the case if the teeth were not so interrupted; for, in the latter instance, the teeth being relatively wide and shallow have a reaming, as distinguished from a shearing, action which generates objectionable heat, increases friction, etc. The disadvantage of this old arrangement was that the first uninterrupted tooth following the last divided one had the entire burden of taking out the stock which remained between the grooves cut by the interrupted teeth with the results that this tooth soon broke down under the strains to which it was subjected, and the tap operated in a faulty manner.

In accordance with the present invention, the top surfaces of the teeth on the tapered portion of the tap are not inclined towards the forward or small end of the tool, by preference these surfaces being parallel to the axis of the tap or, if desired, they may be inclined down toward the rear end of the tap so that there is no back pressure or wedge action exerted between the top surfaces of these teeth and the work, tending to prevent the tool from being fed longitudinally into the work, as was the case with taps as heretofore constructed. Also, the teeth on the tap are so arranged that the duty or burden of removing the rib or stock, formed on the work by the serrated teeth, is distributed along a number of uninterrupted teeth, giving longer life to the tool, and resulting in smoother action in operation, and in more perfect work.

In the accompanying drawing, wherein I have shown, for illustrative purposes, one embodiment which the present invention may take, the figure is a side elevational view of my improved tap cutting a thread in a nut or other piece of work, the latter being shown in longitudinal section.

Referring to the drawing in detail, T denotes, generally, a tap constructed in accordance with the present invention, and W denotes the work or nut operated upon.

The tap is provided at its forward end with a pilot $a$, then with a tapered portion $b$ having teeth 11 with divided or interrupted cutting edges, then with a second tapered portion $c$ having uninterrupted teeth 12 followed by a portion $d$ provided with teeth 13 of uniform outside diameter but tapering at their roots, and, finally, with a non-tapering portion $e$ having teeth 14 of practically the same size and shape as the groove of the thread to be cut. The teeth 11 are of gradually increasing height and have their top surfaces arranged substantially in parallelism with the axis of the tap. These teeth are spirally grooved, as at 20, so as to provide each tooth with a pair of serrations or cutting edges. The serrations of the first tooth will take a slight cut in the work, those of the next tooth a slightly deeper cut, and so on until a pair of grooves of substantial depth are formed with a rib 21 therebetween. The advantage of interrupting these teeth is that the tool can be fed with greater facility and with better results into the work than would be the case if these teeth were uninterrupted; in the latter instance the teeth would have a reaming effect with well-known resultant disadvantages. The teeth 12 on the second tapered portion of the tap, and which teeth, as stated, are undivided, do not have their top surfaces inclined, as has heretofore been the custom, towards the forward end of the tool; these top surfaces, in the present instance, by preference, being substantially in parallelism with the axis of the tap so that these surfaces have no action which tends to hold the tool from being fed into the work. In one manner of speaking, the top surfaces of corresponding teeth 12, etc., are out of alinement with one another lengthwise of the tap, as indicated by the dotted projection lines in the figure of the drawing. It will be seen that the first tooth 12′ of the second tapered portion of the tap is of substantially the same height as the first divided tooth 11′ and is of less height than the last serrated or divided tooth so that it will take out only a relatively small portion of the rib 21 left by the serrated teeth. The next undivided tooth 12″ is slightly higher than the tooth 12′ so that it will take out a little more of the rib, the next tooth 12‴ is still a little higher, and so on until a tooth of the same height as the last divided tooth takes out the remaining portion of the rib. The teeth 12 then continue to gradually increase in height until the thread has been cut to substantially the full depth. It will be seen that with the arrangement described, instead of employing a single tooth for cutting out the rib 21, a relatively large number of teeth 12′, 12″, 12‴ etc., are used for this purpose, each successive tooth taking a small chip so that no one of them is subjected to undue strains.

Attention is called to the fact that the root of the groove or thread between the teeth on the tapered portions b, c, of the tap is straight or non-tapering. This means that, while the teeth 12 gradually increase in height, they are of the same width at their bases or roots. These teeth will progressively cut the thread on the work to the proper depth, but do not increase the width of the groove, that is to say each tooth will cut at its top edges but not along its side edges. After the teeth 12 have cut the thread groove to proper depth, the teeth 13 come into play to cut this groove to the desired width. The portion d of the tap is cylindrical or non-tapering at the tops of the teeth 13, but tapers at the root of these teeth. This means that the tops of these teeth are of substantially like distances from the axis of the tap, but the teeth are of gradually increasing width so that each takes relatively fine cuts along its side edge but cuts little or nothing at its top edge.

After the thread groove has been cut to substantially the desired depth by the teeth 12 and to substantially the desired width by teeth 13, the teeth 14 take a very fine finishing cut so as to bring the groove in the work to the exact dimensions and shape desired.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:

1. A tap having a tapered portion provided with teeth, the top surfaces of the teeth of said tapered portion having a relation to the axis of the tap other than an inclined one towards the forward end thereof.

2. A tap having a tapered portion provided with teeth, the top surfaces of the teeth of said tapered portion being parallel to the axis of the tap.

3. A tap having a portion provided with teeth gradually increasing in height and having their top surfaces parallel to the axis of the tap, the bottom of the groove between said teeth being non-tapering throughout said portion.

4. A tap having a tapered portion provided with teeth having divided cutting edges, each tooth being adapted to cut a pair of grooves leaving a rib therebetween, and a second tapered portion having teeth with uninterrupted cutting edges, the first tooth of said second tapered portion being of less height than the last tooth of said first tapered portion.

5. A tap having a portion provided with teeth increasing in height and having their cutting edges interrupted by a spiral groove, and a second portion provided with uninterrupted teeth gradually increasing in height beginning with a tooth of less height than the last interrupted tooth, and arranged to successively remove the rib formed by said interrupted teeth.

6. A tap having a tapered portion provided with teeth having divided cutting edges, each tooth being adapted to cut a pair of grooves leaving a rib therebetween, and a second tapered portion having teeth with uninterrupted cutting edges, the first tooth of said second tapered portion being of less height than the last tooth of said first tapered portion, all of said teeth having their top surfaces in parallelism with the axis of said tap.

7. A tap having a portion provided with a series of teeth for successively cutting a thread groove to desired depth, and a second portion provided with a series of teeth for successively cutting the thread groove to the desired width.

8. A tap having a portion provided with a series of teeth of uniform root diameter and of progressively increasing height for gradually cutting a thread groove to desired depth, and a second portion provided with teeth of uniform outside diameter and progressively increasing in width for gradually cutting the groove to desired width.

BENGT M. W. HANSON.